(12) United States Patent
Lopez

(10) Patent No.: US 6,380,284 B1
(45) Date of Patent: Apr. 30, 2002

(54) METHOD FOR CONTINUOUS PRODUCTION OF MODIFIED BITUMINOUS MATERIALS

(76) Inventor: Emile Lopez, 14-4 cours du Jardin Public, F-64270 Salies de Bearn (FR)

( * ) Notice: Subject to any disclaimer, the term of this patent is extended or adjusted under 35 U.S.C. 154(b) by 0 days.

(21) Appl. No.: 09/424,662

(22) PCT Filed: May 14, 1998

(86) PCT No.: PCT/FR98/00956

§ 371 Date: May 15, 2000

§ 102(e) Date: May 15, 2000

(87) PCT Pub. No.: WO98/54263

PCT Pub. Date: Dec. 3, 1998

(30) Foreign Application Priority Data

May 29, 1997 (ES) ................................................ 9701176

(51) Int. Cl.$^7$ ............................................... C08L 95/00

(52) U.S. Cl. ............................ 524/59; 524/68; 524/69; 524/70; 524/71

(58) Field of Search .............................. 524/59, 60, 61, 524/68, 69, 70, 71

(56) References Cited

U.S. PATENT DOCUMENTS 5,382,612 A * 1/1995 Chaverot et al. ............. 524/60

* cited by examiner

*Primary Examiner*—Peter Szekely
(74) *Attorney, Agent, or Firm*—Young & Thompson

(57) ABSTRACT

The invention concerns the continuous production of asphalts modified by the addition of polymers and reacted with sulfur. The binders produced by said methods can contain very high amounts of polymers, also combined with secondary materials such as: rubber, various plastics, and waste lubricants. This type of binder, which cannot be obtained by discontinuous batch technology, is produced by the continuous mixing of several asphalt components through a static mixer. Said binders provide very high-performance asphalts and agents for regenerating old asphalts contained in waste road materials, in the process of hot recycling of coated materials. They are also used for producing novel emulsions of highly modified binders, with multiple applications and in particular for cold recycling. This novel method, by regenerating old asphalt contained in waste coated materials, represents a means for waste conversion and for limiting the use of asphalt and road-surfacing aggregates.

13 Claims, No Drawings

METHOD FOR CONTINUOUS PRODUCTION OF MODIFIED BITUMINOUS MATERIALS

This invention pertains to a process for continuous production of sulfur crosslinked polymer asphalts, whereby said process makes it possible to produce all kinds of modified binders, from conventional binders such as are used today to highly concentrated polymer binders that do not yet exist.

Improving the properties of asphalts is today an absolute necessity in order to guarantee improved quality for the materials that use asphalts and to thus help to create and develop new applications. This goal is achieved by increasing the polymer concentration that said materials must assimilate. Unfortunately, few asphalts are truly compatible with polymers, and this incompatibility worsens as the quantity to be introduced into them is increased!

Today two families of polymer asphalts are available on the market:

a) physical mixtures that are produced by simple dissolution of polymers;
b) media that are transformed by a chemical reaction that is induced between components of the asphalts and polymer(s).

If these two discontinuous batch production processes are identical, the properties of the binders that are obtained by a chemical sulfur reaction, at equivalent polymer contents, are superior to those of binders that are produced from simple mixtures, both in terms of elastic performance and in terms of stability or storage under hot conditions. Nevertheless, for various reasons these two concepts do not make it possible to obtain highly modified binders. For no particular reason, where the dissolved-polymer contents can reach 9–10 percent for the majority of asphalts and, in the case of physical mixtures, from 5 to 6 percent polymer, solubility is quickly limited, and these mixtures decant in different phases under the action of an unavoidable phenomenon, which sets in more or less quickly over time. With sulfur-crosslinked asphalts, the polymer content also limits the ability to produce concentrated binders because in the liquid state, i.e., under storage conditions, several hours or several days after vulcanization complete and unstoppable polymerization takes place, leading to a gelatinous state, whereby this happens starting at 6 percent dissolved polymer. Thus, there are many new applications which these types of binders could offer but which have yet to see the light of day for the reasons cited above!

There is tremendous interest in this new process. These new, heavily modified binders will be very useful to the road-building industry, as well as to the field of sealants, and will make it possible to produce materials and coated materials that have very high levels of performance. The same will be true for the production of emulsions from these same binders: no such materials exist today.

Moreover, certain recovered plastics, rubber from discarded tires, and waste oils of mineral, vegetable, or synthetic origin can also be recycled within the framework of the binders produced by the invention.

These new innovative materials will be intended especially to be used to regenerate old coated materials on roads within the framework of the hot-recycling technique. Said innovative materials will promote the recovery, i.e., enhancement of the value, of old asphalt materials on roads and will keep them from being discarded.

From the economic standpoint, the advantages offered to road builders and sealant makers are numerous and can be mainly summarized as follows:

having binders whose performance is much better than that of the binders that are known today;

opening new avenues for techniques for building or maintaining roads at lower cost which, owing to their improved mechanical properties and exceptional fatigue strength, will help to improve the behavior and service life of roads significantly;

contributing to the practicability of emulsions and of the binders produced by the invention by the immediate and direct injection of product onto the feed heads of colloid emulsion mills, thereby opening the way to many new applications that can be provided by these truly special emulsions!

enhancing the value, in road and sealant applications, of certain waste products that today are for the most part destroyed, such as plastics, tire rubber, and lubricants, owing to the advantages offered by the vulcanization reaction that is employed in the invention;

recycling of all kinds of used asphalt materials by regenerating the contained asphalts through the incorporation of certain binders that are the direct result of the invention. The use of some of these crosslinked asphalts that have high polymer concentrations as a way to regenerate old coated materials may be done at a permanent coating facility or at a mobile facility that is outfitted in advance with the process. Depending on the characteristics of the materials that are to be recycled, just about 100 percent of them can be regenerated. This is due to the nature of the regeneration process that is employed within the heart of the old asphalt itself: the addition of plasticizing materials and polymers to the old asphalt structure which, under the crosslinking action of sulfur, will help, on the one hand, to reformulate a rejuvenated asphalt and, on the other, to create a polymer mesh that brings together all of the components. This will therefore be a modified-binder coated material that is obtained by this kind of recycling operation. This accounts for the bright prospects for obtaining, by using these products, recycled coated materials whose levels of performance are at least equivalent to, if not better than, the characteristics that they had at the time when they were first used.

STATE OF THE ART

For more than 25 years now, asphalts have been modified by the addition of polymers in order to improve their rheological properties and also to curb their ability to age. Two main effects are sought. The first is to increase the plasticity range in such a way that, under conditions of elevated temperature, the asphalt remains viscous enough that coated materials, as well as sheets of sealant complexes, are kept from deforming. The second effect, especially at low temperatures, is to reduce the rigidity of the material and to impart to it a great capacity for plastic deformation so that it will be able to withstand great stress.

Many families of polymers are currently used to add this type of modification to asphalt. Among these, the following can be cited: polyolefins, polyvinyl acetates or polyvinyl chlorides, elastomers, etc.. Of all these materials, it is elastomers that are best suited for imparting elasticity and, optionally, plasticity. As a matter of practicality, introduction of these polymers into asphalts is no simple matter. Specifically it is the morphological composition of the base asphalt, i.e., its groups of chemical components: saturated, aromatic, polar, and asphaltene, that dictate the choice of the polymer or polymers and limit-its or their solubility. For a particular type of asphalt, the level of modification that one can hope to achieve is more or less predetermined in advance.

With the exception of the sealant industries, which purchase so-called "special" asphalts, whereby they require that the materials delivered that they use be of an unvarying nature and composition in order to keep the quality of the plastic mixtures that are produced stable, refiners supply only so-called "run-of-the-mill" asphalts in conformity with specifications. This is due to the organization of the petroleum markets and the technical and economic constraints imposed on refining. It is impossible for this industry to continuously produce a special type of asphalt. Because of the risks of segregation, attempts to introduce significant quantities of polymers have not succeeded in producing stable binders that are adapted to industrial use.

Chemically transformed asphalts obtained from styrene-butadiene (SB) of the statistical or stereo regulated block type, or tri-sequence styrene-butadiene-styrene (SBS), or styrene-isoprene (SI), or styrene-isoprene-styrene (SIS), or ethylene-propylene-diene (EPDM), or other types of polymers which have an unsaturated and a sulfur group in their chemical structures, make it possible to obtain, by using 30–50 percent less polymer, properties that are equivalent to those of binders that are-prepared by simple physical mixing. Owing to its high solubility, polymer SB is preferably employed in this kind of binder. Since this product is not, strictly speaking, a true polymer, it is its low molecular weight and the careful selection of the styrene/butadiene distribution that make it compatible with the full range of asphalts. Depending on the penetration of the asphalt, contents that may exceed 30 percent can be dissolved. On the other hand, without using the chemical reaction with sulfur, this material modifies the natural properties of the starting asphalt very little. Nevertheless, for contents on the order of 6 percent of SB polymer, these crosslinked products have a tendency to evolve, starting with the crosslinking that is carried out, and to polymerize completely during production or while in storage (forming a gelatinous mass). At this level of polymer concentrations, if the phenomenon of caking does not arise during production, viscosity will increase to such an extent that moving the asphalt: pumping and/or stirring, becomes impossible. In practical terms, these kinds of binders that are close to the state of gelling have difficulty mixing with other asphalts and cannot wet mineral or artificial surfaces in order to coat them.

In both these cases, this condition of instability has significant economic implications due to the loss of product or the neutralization of tanks and, aside from the risks that are incurred, clearly indicates the limits to the use of the discontinuous batch process for modified asphalts.

INVENTIVE ACTIVITY

In order to solve all of the problems mentioned above, the applicant has found that, just after the direct injection of the sulfur-asphalt component or the polymer-asphalt mixture, the reaction took place very quickly and was irreversible, thereby helping to ensure that these types of crosslinked polymer asphalts acquired and immediately exhibited all of their characteristics. The use in practice of this new type of process, which makes it possible to mix all of the components just before the crosslinked binder has to be used, offers a broad range of possible uses that were previously unimaginable.

Up until now, the production of crosslinked polymer asphalts has been done using a discontinuous process. The principle of this process was: into a heated and stirred reactor are introduced, while being stirred, along with the amounts required for the formulation, in succession the necessary asphalt and then, over a relatively long period of time, depending on the amount to be employed, the polymer, optionally with the use of a liquid-solid grinder, which helps to speed up the dissolution of the solid and, if necessary, additives. When the mixture appears to be sufficiently homogeneous, sulfur or any other molecule that is able, by thermal decomposition, to produce it is incorporated, taking great care to ensure that the solid, at the instant that it makes contact with the surface of the medium, is immediately drawn completely into mixture. For a binder that contains between 3 and 4 percent polymer, it takes 6–7 hours to produce such a product, with a phase of at least two hours between the time when the sulfur begins to be introduced and stirring is finished and the binder is transferred to storage.

With the new process provided by the invention, depending on the application and the amount of polymer that has to be introduced, it will be necessary to prepare a SB polymer-asphalt concentrate, a mixture of the physical type, from asphalts with a penetration of between 60/70 (0.01 mm) and 600/800 (0.01 mm), and polymers such as styrene-butadiene, styrene-butadiene-styrene, styrene-isoprene, and styrene-isoprene-styrene. Preferably 200/500 (0.01 mm) penetration asphalts will be used to which 10–30 percent polymer, preferably of the styrene-butadiene type, can be added whose molecular weight will be between 55,000 and 95,000 grams. After it is dissolved, this product will represent the base concentrate of polymer asphalt. At the site where it is used, depending on the intended use, it will be necessary to prepare at least one second asphalt component that contains the chemical reagent, preferably a sulfur or a sulfur donor, to be selected from among molecules of such as polysulfides, etc. The asphalt will be selected from among asphalts with a penetration of between 10/20 (0.01 mm) and 180/200 (0.01 mm). The amount of sulfur or equivalent sulfur released by the donor agent will be between 1 and 15 percent. Depending on what is needed, it will also be possible to produce a third base that contains other polymers of virgin quality or polymers obtained from recycling, such as polyethylene or polypropylene or vinyl acetate or vinyl chloride or polyurethane, etc., or recycled rubber from tires. The asphalt will be preferably selected from among wet, high-penetration asphalts. The polymer concentration will depend on the type of types of polymers used. Depending on compatibility, the concentration may be between 5 and 15 percent relative to the asphalt, and then surface-agent chemical additives (polyamines, organic fatty acids) may also be introduced.

The facility will include the following items of equipment: injection pumps, mass flow counters, controlled and regulated valves, temperature indicators, and non-return valves. All of this is connected by pipes that are laid out with hot oil and are connected to the different tanks. All of these pipes empty at the inlet/feed of an in-line mixer that can be of different types: a static mixer or a chamber with dynamic stirrers. Preference will be given to the static mixer, which is simple in design, and said mixer will be sized for the desired hourly production range and for the different viscosity values of the products that it will have to mix. Of course, the way in which the characteristics of the mixer are defined will influence the characteristics of the metering pumps and, in particular, their delivery pressure. Likewise, all of the tanks and all of the items of equipment will be kept at high temperature and will be adapted to the type of product being stored, i.e., between 140 and 250° C. To the extent required, the various pumps will send into the mixer each basic mix:

base concentrate with the reagent polymer (SB);

a diluting agent with a sulfur reagent;

a mixture with other polymers and/or additives.

The in-line mixer, which is designed to thoroughly disperse all of the components on a continuous basis, will help to initiate the reaction between the components of the asphalt, sulfur, and the SB polymer, and then to promote their development, thereby making it possible to obtain at the outlet finished crosslinked concentrated polymer asphalt.

When it is ouput, the binder is sent directly to the application units, preferably by hooking up the outlet pipe, using the shortest connections possible, either to a coating center mixer coating unit or to the injection ramp of a drum of the "drum-dryer-kneader/coater" (TSM/E) type of a permanent or mobile coating center or of a drum of a coating center of the mobile hot recycling unit for coated road materials or to the inlet of a coating machine for manufacturing sealant sheets or complexes.

As an example, the process for producing a crosslinked asphalt with 12 percent SB polymer and 0.3 percent sulfur is indicated. Two mixtures are prepared: the first (A) is perfectly homogeneous and hot at 180° C. and will be composed of 85 parts direct-distillation asphalts with a penetration of 350 (0.01 mm) with 15 parts of a two-block styrene-butadiene polymer in proportions of 25/75; the second mixture (B), which is kept at 160° C., consists of 85–99.9 parts but preferably 98.5 parts of the same 350 (0.01 mm) penetration asphalts and 1–15 parts but preferably 1.5 parts dissolved sulfur. Two pumps, with enough delivery pressure to overcome the load losses for the entire circuit, will inject the two fluids separately into the feed head of the static mixer. The flow rate of each pump will be controlled by mass counters that act on the controlled electric valves. The temperatures of the mixtures will also be benchmarked and regulated. The two mixtures will then be injected at a ratio of 80 parts of (A) to 20 parts (B). The product obtained at the outlet of the mixer will immediately have all of the characteristics needed so that it can be used in a new application as a crosslinked asphalt with a final proportion of polymer of greater than at least 4% of the total and preferably with 12 percent polymer.

This invention has some extremely important advantages. It will make it possible to employ reinforced binders with polymer contents of more than 10 percent, up to 35 percent, in order to produce special coated materials for roads. The binders that are obtained from the discontinuous process would not make it possible to produce such materials. Thus, this invention opens the way to producing coated materials that have very good properties, which will result in coated materials that are intended to be put to new uses, whereby said materials will guarantee longer service lives for road structures:

reinforcing and flexible coated materials;

coated materials that drain very well (with a high degree of void >30 percent);

ultrafine coated materials, etc.

Moreover, the incorporation of molecules that are able to release sulfur as they undergo thermal breakdown and that are associated with vulcanization accelerators and/or inhibitors will make it possible to manipulate the kinetics of vulcanization by speeding up or slowing down the reaction that is induced by sulfur between the polymer and the asphalt. It will be possible to pre-program the speed of the reaction based on the components cited above, such that said reaction will take place instantaneously or progressively over time. There was no point in even trying this approach with the old discontinuous process!

At the same time, there is also the option of using the invention to direct the binder that comes from the mixer straight to the inlet of a colloid emulsion mill. Keeping the emulsion at temperature of greater than 50° C. will make it possible to immediately ensure the dispersion of particles of an asphalt that has a high concentration of crosslinked polymers; this cannot even be imagined today for the binders that are obtained from the discontinuous process with the existing equipment. As a matter of fact, the extreme elasticity of the products that are produced by the discontinuous process represents a physical barrier to their dispersion in water. Today, owing to a lack of cutting energy for cleaving the chemical chains that are created by the crosslinking reaction, the technology for the fabrication of emulsions of modified and crosslinked asphalt can be applied only to binders that contain no more than four percent polymer.

Likewise, according to the invention it will be possible to produce binders with very high polymer concentrations as regeneration agents for old asphalts that are contained in old coated materials in roads and to take advantage of the capability of the crosslinking reaction, which is ensured by a sulfur-vulcanized polymer asphalt, to propagate to any other new or old natural asphalt, such as is claimed in Spanish patent application P 9601837. Enhancing the value of old coated materials by the technique of hot recycling consists in reproducing a new asphalt by reusing all of the old materials. Because of the fact that the old materials are reused, it goes without saying that there is economic significance to this technique. In order to ensure that the recycled coated material will have acceptable characteristics, it is necessary to impart to the old asphalts properties that are at a level that is at least equivalent to, if not superior to those that said material originally possessed. The implementation of this technology runs into a physical limit corresponding to the total asphalt concentration. The new recycled coated material may not exceed a certain limit because too much binder can, in the road layer where it is used, create problems such as rutting. The need to fulfill this criterion limits the development of the interesting area of recycling to the economic sphere, i.e., between 80 and 100 percent of the material. The initial quantity of asphalt contained in a material to be regenerated is generally on the order of 5 percent or more; this leaves little room for a regenerating agent to be added (1.5 or even less than 1 percent). In view of the small quantities that can be used, it is clear that the formulation of such a regenerating agent must include such a large quantity of vulcanized polymer that there is no procedure today that would allow it to be produced. It is thus clear why there is significance to the invention, which makes it possible to produce a crosslinked, polymer-concentrated asphalt right at the time when this "regenerating agent" binder is introduced into the kneader or into the TSM/E. This technique requires that the materials be separated in advance so that they can be reheated advantageously. Under these conditions the regenerating agent, which is produced on the spot, is immediately brought to the injection ramp, and falls on the hot aggregate (160/190° C.), will be dispersed evenly over the materials, and will integrate completely into the old asphalt, leading to the creation of the new binder. When installed on a hot recycling machine such as the ART (asphalt recycling travel plant) after certain steps are taken: division of the asphalt storage tank into various compartments, mounting of the platform for the fabrication team, etc., this same device produces the same results.

The sealant industry is also another example of an application for the invention. To produce complex sheets and sealing covers, this industry uses binders that are modified by high polymer concentrations. Because of the problems mentioned above, the mixtures that are created may not exceed 10 percent, and after these products are fabricated, they cannot be stored. Using the continuous production process would make it possible to continuously feed the coating machines, thereby eliminating the above-mentioned problems and at the same time taking advantage of the new levels of performance provided by these new binders.

DESCRIPTION OF THE INVENTION

The series of examples presented below illustrate the technical advantages that are offered by the various capabilities of the invention.

EXAMPLE 1

Three asphalts with different chemical compositions and different penetrations were adopted: asphalts (A), (B), and (C) (see Table 1).

TABLE 1

| Asphalts | A | B | C |
| --- | --- | --- | --- |
| saturated | 21 | 44 | 48 |
| aromatic | 63 | 45 | 35 |
| resinous | 5 | 3 | 8 |
| asphaltene | 11 | 8 | 9 |
| Penetration 0.01 mm | 347 | 198 | 86 |

Four types of polymers were also selected:

(a) 3-block SBS with a molecular weight of 150,000

(b) 2-block SB with a molecular weight of 75,000

(c) standard polyethylene of the low-density type (d) polyvinyl ethylene-acetate with 30 percent acetate.

Using the above-mentioned three asphalts, a first series of tests was carried out that consisted in making up six mixtures with increasing polymer contents (3, 6, 9, 12, 15, and 20 percent), using each type of polymer. This operation was carried out in glass tanks that were equipped with stirrers and condensers and were heated by temperature-regulating heating tanks. The temperature and duration of stirring were adjusted to each formulation, the type of asphalt, and the nature and amount of the polymer. The higher the hardness of the asphalt and the larger the quantity of polymer, the longer the stirring and the higher the temperature. For these tests the temperature was set at between 160 and 195° C., and the stirring times varied between 3 and 12 hours. The homogeneity of the dispersion was checked by visual observation of a glass rod that was dipped into the medium. The final check was made by screening on a fine screen (80 microns). (See Table 2).

In conclusion, it was noted that only the two-block styrene-butadiene polymer (b) dissolves in asphalts (A) and (B) at least up to a concentration of 20 percent, and also in asphalts (C) up to a concentration of at least 15 percent. As for polymer (d), it is soluble at least up to 9 percent in asphalts (A) and (B), and polymer (c) is soluble in asphalt (B). At a content of 6 percent, polymer (a) is insoluble in asphalt (B), and at this same concentration polymers (a) and (c) are insoluble in asphalt (C). In general, at a concentration of 3 percent the four polymers are soluble in the three asphalts.

TABLE 2

| | | % in Polymer of the Mixtures | | | | | | Reticulated Asphalt |
| --- | --- | --- | --- | --- | --- | --- | --- | --- |
| Asphalt | Polymer | 3 | 6 | 9 | 12 | 15 | 20 | 12% |
| A | a | N | N | I | I | I | I | |
| A | b | N | N | N | N | N | N | N RAb (pd) |
| A | c | N | N | I | I | I | I | |
| A | d | N | N | N | N | I | I | |
| B | a | N | I | I | I | I | I | |
| B | b | N | N | N | N | N | N | N RBb (pd) |
| B | c | N | N | N | I | I | I | |
| B | d | N | N | N | I | I | I | |
| C | a | N | I | I | I | I | I | |
| C | b | N | N | N | N | N | I | N RCb (pd) |
| C | c | N | I | I | I | I | I | |
| C | d | N | N | I | I | I | I | |

Polymer: N soluble I Insoluble

In view of these results, polymer (b) was adopted. Just as before, three mixtures with 12 percent of this polymer were made up from the three grades of asphalt. For each mixture, when dissolution was complete, 0.15 percent sulfur was added while heating and stirring were continued for two hours. The reactive products were referenced as follows: RAb (pd), RBb (pd), and RCb (pd); (pd)=discontinuous process (see the references indicated in the far right column in Table 2). Each binder that was obtained in this way was put into a sealed metal box and then placed in an oven that was kept at 170° C. The viscosity of these products was monitored over time. At these polymer contents, viscosity increased considerably until the medium exhibited a structural state such that it prevented any further measurements (or by the entire product changed into a gelatinous block). (See Table 3)

TABLE 3

| | Temperature Hold Time at 170° C. (in hours) | | | |
| --- | --- | --- | --- | --- |
| Viscosity | 12 | 24 | 48 | 72 |
| RAb (pd) (Po) | 16 | 18 | 30 | 45 |
| RBb (pd) (Po) | 25 | 35 | 65 | P |
| RCb (pd) (Po) | 31 | 53 | P | P |

P: completely polymerized

After being stored for one day under near-real conditions, these products were in a state that made it impossible to use them: it was difficult to knead them and impossible to pump them, and therefore there was a danger of caking in the tanks and tank trucks. The discontinuous production process cannot offer adequate guarantee of stability for crosslinked binders with high polymer concentrations, nor can it make use of their many advantages.

EXAMPLE 2

In order to verify the properties of the binders that are obtained using the invention, in a facility corresponding to the patent application three products were produced from three asphalts (A), (B), and (C) of the previous example, polymer (b), and sulfur. The compositions of these modified asphalts were identical: 12 parts polymer (b), 0.15 part sulfur in 87.85 parts asphalt. To produce these crosslinked polymer asphalts, on the one hand a physical mixture containing 15 parts polymer (b) in 85 parts asphalt was prepared at a temperature of 185° C.: binder MP; and, on the other hand, at a temperature of 160° C. a mixture of sulfur asphalt containing 0.75 part sulfur dissolved in 99.25 parts asphalt: binder MS, was prepared. Using two metering pumps, the two mixtures were injected into a static mixer in proportions of 80 parts mixture MP to 20 parts mixture MS. Three sulfur-crosslinked polymer asphalts were thus obtained, referred to as: RAb (pc), RBb (pc), and RCb (pc) (pc=continuous process). Samples taken at the outlet of the static mixer were used to immediately produce test specimens for items such as: penetration, temperature of globule and ring, and dumbbells of type H2. Another series of specimens taken from the other binders that were prepared was also evaluated according to the discontinuous process of previous example 1, of references RAb (pd), RBb (pd), and RCb (pd). The results that are presented in Table 4 confirm that the characteristics of the binders produced according to the invention are equivalent to those of the products obtained using the old process, to the extent, of course, that the formulation conditions make it possible to produce said products (as indicated in the example and Table 4).

TABLE 4

| | | | Tensile Tests 20° C. - 10 mm/min. | | | |
| --- | --- | --- | --- | --- | --- | --- |
| | | | Before RTFOT* | | After RTFOT* | |
| Polymer Asphalt | Pene- tration | TBA ° C. | Stress $kg/cm^2$ | Elonga- tion, % | Stress $kg/cm^2$ | Elonga- tion, % |
| RAb (pc) | 205 | 70 | 3.4 | >900 | 3.9 | >900 |
| RAb (pd) | 208 | 71 | 3.3 | >900 | 3.9 | >900 |
| RBb (pc) | 125 | 75 | 5 | 900 | 5.8 | 880 |
| RBb (pd) | 123 | 76 | 4.9 | 890 | 5.9 | 860 |
| RCb (pc) | 40 | 83 | 6.1 | 850 | 7 | 710 |
| RCb (pd) | 43 | 84 | 5.8 | 830 | 6.9 | 690 |

*Rolling Thin Film Over Test

EXAMPLE 3

Below a series of tests was carried out that were intended to illustrate, in the different examples presented, the significance of using these crosslinked asphalts produced by the invention that make possible the various applications, such as:
- improving the techniques for construction and maintenance of roads using new asphalt materials with high performance levels that cannot be achieved today;
- producing modified binders based on crosslinked styrene-butadiene polymers mixed with recycled polymers. This alternative represents a way of reducing the cost of producing these modified binders while enhancing the value of recycled polymers;
- making it possible to produce special asphalt emulsions that are rich in crosslinked polymers but that cannot be produced today using current dispersion techniques. The production of binders which, after the emulsions in which they are dispersed are broken, have a polymer concentration of more than 4 percent opens the way to many new uses;
- improving the chances of developing the techniques for recycling and regenerating old road coated materials;
- having a technique that makes it possible to eliminate and enhance the value, by recycling within the framework of the continuous fabrication process that comprises the invention, the rubber from old tires, certain used plastics, and waste lubricants. This avenue is opened by the principle of separate and continuous injection-of the various components into the in-line mixer. The fact that the mixture is created and that the chemical reaction among sulfur, SB polymer, and the components of the asphalt takes place simultaneously produces a medium that combines highly stable recycled products under the action of the three-dimensional mesh that is created by the crosslinking. The way in which the proportions between the new SB polymer/sulfur and recycled plastics/rubber are adjusted will be adapted to the desired visco-elastic nature of the reconstituted binder;
- significantly improving the performance levels of sealing binders.

EXAMPLE 3A

Using aggregates such as Diorite which have a granularity of 10/14 and a ratio of 80iu/3.15 mm granularity elements of less than 5 percent and less than 2.5 percent filler (<80 microns), a draining coated material was produced with 3.6 parts asphalt binder per hundred parts aggregate. The asphalt used was of the modified type, produced according to the process of the invention; it came out of the static mixer at 180° C. and was then poured into the hot aggregate, which was raised to a temperature of 180° C. To implement this example, the asphalt from example No. 2, reference RCb (pc), containing 12 percent SB polymer (b) was used. The binder was introduced in the desired amount into the kneaded and heated aggregate. Marshall (ASTM 1559) specimens were produced according to the standard: compaction by 75 blows on each face. After standard preservation (dry and wet), the Cantabro test, which consisted in monitoring the losses of coated material due to shock and attrition of the Marshall specimens that were placed in a Los Angeles cylinder, was carried out according to the protocol conditions. The Cantabro test is a Spanish test, NLT 362, carried out on a test machine as specified in ASTM C 131 and C 535. For one type of draining coated material with this degree of void, the losses of material were remarkably reduced: Cantabro test: void content 33.6% weight loss: dry 2.5% wet 3%

EXAMPLE 3B

Under the same conditions as in example 3A, the same type of coated material was produced, but this time using a crosslinked binder that was produced according to the traditional procedure, of the discontinuous batch type, containing 12 percent SB (b) polymer. This was asphalt RCb (pd), which was first held for 24 hours in a closed container placed in an oven at 170° C. Two hours before the coated material was produced, the oven temperature was raised to 180° C. It was noted that while the draining coated material was being produced, the RCb (pd) asphalt did not make it possible to properly coat the stone chips, owing to its very high viscosity. Another coating-material production test was repeated, whereby the temperature of the two components was first raised to 210° C. This did not improve the quality of the coating material. Nevertheless, Marshall tests were carried out on this latter coated material under the same conditions as before. The results that were found are as follows:
Cantabro test: void content 34% weight loss: dry 23% wet 37.5%

Upon completion of these two tests: (3A) and (3B), it was noted that it was possible to produce draining coated materials with a void content of up to 33% using a single granularity, while at the same time with binders that are currently available and with much more compact granular formulations of no more than 22–24 percent in terms of void content, the losses indicated by the Cantabro test were greater than 8%. Knowing that as the porosity of the draining coated material increases, the degradation of the Marshall specimens also increases significantly, the results provided by the binder produced by the invention are thus excellent. The results from coated material 3A are superior to those of the best draining coated materials of type 0/10 based on traditional polymer asphalt, while the coated material obtained with the binder that is produced by the normal process could not, despite having characteristics of equivalent modification, be used without later risk of disorder.

EXAMPLE 3C

From a 0/10 granulometric formulation, by selecting the cut of the granulates that makes it possible to have a granularity that leads to a 2/6 mm discontinuity in the granulometric curve and by defining the proportion of the aggregates such that the 6/10 granular fraction is 58% associated with a percentage of filler of 5.5%, two coated materials were produced that were to be used in thin layers. The conditions under which these materials were produced were the same as for tests 3A and 3B. The binders used were also those from the previous test, i.e., RCb (pc) and RCb (pd). The binder content adopted was 5.7 parts per hundred parts aggregate. The RCb (pc) asphalt produced according to the invention was processed at a temperature of 185° C. until such time as the coated material was produced so that it could be injected onto the materials that were heated to 180° C. The coated material that was obtained was homogeneous and normal in appearance. It was compacted in the form of slabs until a well compacted material was obtained. As in the previous test, the other asphalt, RCb (pd), was first kept for 24 hours in an oven at 170° C., whereby the temperature was subsequently raised to 180° C. two hours before the coated material was produced, whereby the aggregates were held at 180° C. Under these conditions and with this formulation, it was not possible to coat the large elements. In order to improve the coating of the materials, the fabrication process was repeated, this time raising the temperature of the two components to 210° C. At this abnormally high temperature, no improvement in the quality of the coating was noted. In order to be able to fabricate this coating with a crosslinked polymer asphalt comparable to the previous binder, it was necessary to reduce the content of polymer (b) quite significantly, i.e., from 12 to 7.5 parts to 92.5 parts asphalt. The coated material that was obtained in this way was compacted in the form of slabs until a well compacted material was obtained. From the slabs of the two types of coated materials, specimens were extracted and subjected to direct tensile tests in order to determine the modulus in tension. The results obtained were as follows:

| Tensile Tests | Moduli | |
| --- | --- | --- |
| | 10° C./0.01 sec | 0° C./300 sec. |
| 0/10 5.7 ppc of binder RCb (pc) | 18,340 MPa | 9770 MPa |
| 0/10 5.7 ppc of binder RCb (pd) but with 7.5% SB (b). | 6220 MPa | 4330 MPa | ppc = parts per hundred

Note the large difference in the values of the modulus for each coated material, because of the type of asphalt used, owing to the difference in the concentration of crosslinked polymer (b). Achieving this exceptional level (18,340 MPa), which is very close to the values of rigid materials based on hydraulic binders, is possible due to the use of a crosslinked asphalt that is made possible by the continuous process. Using such a coated material that is obtained with a binder of type RCb (pc) offers the advantage of being able to reduce significantly the operational thicknesses owing to the large capacity of this material for deformation and its very high reinforcing power.

EXAMPLE 4

The purpose of this example was to show the possibilities of producing emulsions of binders that are crosslinked and modified by high polymer contents, with the advantages that these new kinds of products offer. The fabrication of the binder was done using the same material as was employed in example 3A. In this case, the modified asphalt that was obtained according to the process was of type RAb (pc), using the asphalt of base (A) and with a final polymer (b) content of 12 parts, as well as with 0.15 part of sulfur to 87.85 parts asphalt. The outlet of the static mixer was connected to the inlet of a colloid mill for the production of asphalt emulsions. For the production of the crosslinked polymer asphalt, a continuous rate of flow through the static mixer was selected that was compatible with that of the emulsifying machine. The temperature that was adopted for the fabrication of the modified binder was between 160 and 165° C., and an aqueous phase with the following composition was prepared:

| Aqueous Phase 35° C. | | |
| --- | --- | --- |
| water | 34.7% | 35% |
| emulsifier (Dinoram S) | 0.18% | |
| HCl 2° Be | 0.12% | |
| Asphalt RAb (pc) (160° C.) | | 65% |

After the aqueous phase began to be fed in at the selected flow rate, the binder coming from the static mixer was introduced progressively, in such a way that its flow rate was brought to a ratio of 65% relative to total emulsion. Under these conditions a normal-looking emulsion was obtained at a temperature of 92° C. On a sample that was taken, analysis indicated a pH of 2.8 and a water content of 34.6%. The emulsion was poured into metal assay crucibles. Said crucibles were placed in a ventilated oven and held at 50° C. for 15 days. The binder that was recovered in this way was used to prepare traction specimens, which were tested and yielded the following results:

| Traction Test 20° C. - 10 mm/min | | |
| --- | --- | --- |
| Binder Rab (pc) recovered by evaporation after going into an emulsion | Elongation at rupture 900% | Stress at failure 4.2 kg/cm$^2$ |

In this case and taking the approach of conventional batch production of the polymer binder, it would not have been possible to cause such a binder, whose composition exceeded 3% polymer, to go into emulsion. We thus see the significance of this innovation and the real prospects for new applications considering the fact that up until now no such binder has existed. New materials resulting from the application could be envisioned, such as cold coated materials, emulsion gravel, and the use of these emulsions as agents for cold recycling of old coated materials.

EXAMPLE 5

The possibility of transferring the crosslinking potential of a polymer asphalt that is vulcanized by sulfur, either immediately or long after the reaction has taken place, to a simple asphalt: new (obtained from the refinery) or old (after spending several years on a road), will be demonstrated using the following examples. Having presented the major drawbacks of the irreversible changes in viscosity that are associated with the risk of total polymerization of the binder in its volume, as well as the impact on the quality of the coated materials due to their poor wetability (examples 1, 3B, 3C), the application of the invention to the technique of hot recycling of old coated materials should make it possible to generalize this technique to all cases encountered, regardless of the state of the asphalt or its concentration in the material. The parameters indicated below will make it possible to illustrate these possibilities in the following examples.

As a reference, the regenerated coated material of type 0/14 should have the following characteristics:

| Cement percentile | 3.6 |
|---|---|
| Content of regenerated binder | 5.95 ppc | ppc = parts per hundred

Table 5 indicates the composition of the oldcoated material to be recycled; its asphalt content is 4.52 parts per hundred.

TABLE 5

| ASTM screen | 0.75 | 0.5 | 3.8 | 4 | 8 | 30 | 50 | 100 | 200 |
|---|---|---|---|---|---|---|---|---|---|
| % passing through | 100 | 94 | 83 | 64 | 45 | 31 | 17 | 11 | 7.5 |

The characterization of the old asphalt that is extracted from the millings of the coated material and with a penetration of 18 and a temperature of 72° C. of B and A. Its visco-elongation properties on H2 altered for traction conditions at 20° C. at 10 mm/min are as follows:

| Stress at failure | 17 kg/cm$^2$ |
|---|---|
| Elongation at rupture | 2% |

In order to obtain the recycled coated material according to the 0/14 formulation desired above, it was necessary to add 1.43 parts per hundred of regeneration binder.

EXAMPLE 5A

From asphalt (A) with a penetration of 347 (0.01 mm) from example No. 1 and by adding 11% of an asphalt with a penetration of 90 (0.01 mm) from the same source as asphalt (A), mixing produced a new asphalt with a penetration of 300, called a "regenerating agent" (AR).

From said asphalt (AR) an asphalt was prepared that was concentrated in polymer (b) at a ratio of 10 parts of polymer (b) to 90 parts of asphalt (AR). After this mixture was dissolved, 0.15 part sulfur was slowly added to it. After stirring was done for two hours, a conventional crosslinked polymer asphalt was obtained that was called "conventional crosslinked regenerating agent" (ARRC).

From asphalt (AR) with a penetration of 300 (0.01 mm), an asphalt was prepared that was concentrated in polymer (b) by dissolving 12.5 parts of polymer (b) to 87.5 parts of asphalt (AR). By contrast, using this same asphalt (AR), a mixture was produced with 0.75 part sulfur in 99.25 parts asphalt (AR). Using the same equipment as indicated in example No. 2, with the process of the invention a regenerating asphalt was continuously fabricated by injection-mixing into the static mixer 80 parts of the polymer concentrate with 20 parts of sulfur asphalt. At the outlet of said mixer, a crosslinked polymer asphalt was obtained that was referred to as "crosslinked regenerating agent, continuously processed" (ARRPC).

From millings of the old coated material, the old asphalt was extracted by dissolution and then evaporation of the sulfur, and from the three types of binder indicated above the regenerated asphalt, as produced within the framework of a hot recycling operation, was reconstituted by simulation. Each binder was regenerated by mixing 76 parts of asphalt extracted from the millings with 24 parts, in succession, of each of the three asphalts that are regarded as regeneration additives. Each of the three new binders that were thus obtained was analyzed: regenerated asphalt, conventional regenerated crosslinked polymer asphalt (BRRC); and continuously regenerated crosslinked polymer asphalt (BRRPC); see the values consolidated in Table 6.

TABLE 6

| | Regenerated Asphalt | | BRRC | | BRRPC | |
|---|---|---|---|---|---|---|
| | Before | After | Before | After | Before | After |
| | | | RTFOT | | | |
| Penetration | 32 | 18 | 33 | 30 | 35° | 31 |
| TBA ° C. | 71 | 77 | 76 | 78 | 75° | 77 |
| | | Tensile test at 20° C. 10 mm/min. | | | | |
| Stress at failure kg/cm$^2$ | 16.7 | 32 | 9.3 | 16 | 5.9° | 7.9 |
| Elongation at rupture, % | 5 | 0 | 450 | 337 | 620° | 510 |

Specimens cooled immediately after being produced

An examination of the results shows the transformation effect provided by the sulfur cross-linked regenerating asphalt since in both cases where a regenerator based on a polymer asphalt that was cross-linked with sulfur, the base asphalt, in this case the old asphalt, acquired a capacity for elasticity that was manifested as a significant increase in its deformation potential. As for the old asphalt, the addition of new asphalt tends to soften it slightly, which has a very little impact on its favorable behavior on roads.

EXAMPLE 5B

Coated materials that were recycled from the old millings and following the 0/14 formulation indicated above were then fabricated using the two regeneration agents (ARRCA) and (ARRPC): the latter binder (ARRPC) is one of the products obtained through the use of the invention. Retaining the same fabrication conditions as indicated in the various tests 3, i.e., by adding 1.43 parts per hundred of a regeneration agent to the millings and mixing the entire mass under the same conditions as in a kneader or in a kneading drum at coating centers. The coated materials that were obtained in this way: (A with binder (ARRC) and B with binder (ARRPC)) were used to carry out the following tests:

PCG (rotary shearing press)
Rutting
Direct tensile test
Marshall test
The complete results obtained are as follows: Table 7

TABLE 7

|  | A | B |
|---|---|---|
| Rotary Shearing Press | | |
| compactness at 60 rotations % | 94 | 94 |
| compactness at 80 rotations % | 95.5 | 96 |
| Rutting Test (compactness of slabs: 95.5%) | | |
| Ruts at 60° C. after 15,000 cycles % | 2.9 | 3 |
| Ruts at 60° C. after 30,000 cycles % | 4.7 | 4.8 |
| Direct Tensile Test | | |
| Modulus at 10° C./0.01 second MPa | 12,940 | 13,200 |
| Modulus at 0° C./300 seconds MPa | 6020 | 5980 |
| Marshall Compression Test | | |
| Compression strength kg/cm$^2$ | 1470 | 1420 |
| Deformation mm | 1.5 | 2.1 |

An examination of these characteristics confirms that the effects provided by these two regenerating agents are similar and also confirms the excellent performance levels provided by these two coated materials.

EXAMPLE 5C

In this example the effect of storage time on regenerating agent (ARRC) was evaluated. This asphalt additive was placed in a sealed container and put into an oven at 170° C., and its viscosity was tracked as a function of storage time. After being stored for four days, the additive was unusable.

TABLE 8

| Changes in the Viscosity of Additive ARRC during storage | | | | | |
|---|---|---|---|---|---|
| Time (in hours) | 12 | 24 | 48 | 72 | 96 | 120 |
| Viscosity, Po | 16 | 17 | 28 | 40 | 86 | polymerized |

Using the same protocol as was employed in example 5B, coated materials were fabricated from this regenerating agent, which was stored in succession for two (C) and 3 days (D), whereby the same series of test was carried out.

TABLE 9

|  | C | D |
|---|---|---|
| Rotary Cutting Press | | |
| Compactness at 60 rotations % | 89 | 83 |
| Compactness at 80 rotations % | 90 | 85 |
| Rutting Test (compactness of slabs: 95.5%) | 94 | 91.3 |
| Ruts at 60° C. after 10,000 cycles % | 7 | 13 |
| Ruts at 60° C. after 30,000 cycles % | 22 | 32 |
| Direct Traction Test | | |
| Modulus at 10° C./0.01 second MPa | 6530 | 1510 |
| Modulus at 0° C./300 seconds MPa | 4300 | 75 |

TABLE 9-continued

|  | C | D |
|---|---|---|
| Marshall Compression Test | | |
| Compression strength kg/cm$^2$ | 2730 | 4830 |
| Deformation mm | 0.5 | 0.3 |

When these results are examined and compared to those obtained from test 5B, a drop is noted in the performance levels of the two recycled coated materials due to the large increase in the viscosity of the asphalt being used as the regenerating agent.

EXAMPLE 5D

The purpose of this test was to demonstrate the possible extensions of the technique of hot recycling of old coated materials within the framework of the use of the invention, whereby few if any new granulates would be added. In the case, for example, where the coated material to be recycled has a high content of old asphalt (>5 parts per hundred), the amount of regenerating agent to be added was small, on the order of less than one part per hundred. Knowing that it is necessary to incorporate into the asphalt to be regenerated a minimum quantity of polymer in order to be able to adequately improve the characteristics (whereby the polymer concentration after regeneration is, of course, a function of the characteristics that are desired for the recycled coated material: a minimum of 1% but more likely on the order of 2%, or greater than 2.5%), in the case where the amount of regenerating agent that had to be added was small: on the order of 1% or, in parallel, the final polymer content in the recycled binder was to be to 2.5%, the content of polymer to be integrated into the regenerating agent was thus 21% polymer. For this high value and as indicated in examples 1 and 2 and then illustrated in the other examples, the conventional discontinuous batch process is unusable.

In the following example a regeneration agent with a very high polymer concentration was fabricated according to the continuous production process of the invention, with allowance for the fact that the milling to be recycled was a coated material of type 0/14 that contained 5.2% asphalt. Knowing that the performance levels of the recycled coated materials require an addition of 2.5% to the regenerated asphalt, the formulation of the two components that were to be produced in advance and that were to be used for the continuous fabrication of the regenerating agent was as follows: polymer asphalt with 23.4 parts polymer (b) in 76.6 parts asphalt (B) and sulfur asphalt with 3.75 parts sulfur in 96.25 parts asphalt (A). The continuous fabrication of this regenerating agent was done using the facility described above; the metering pumps injected the two components into the static in-line mixer in proportions of 80 parts polymer asphalt to 20 parts of the sulfur asphalt mixture, with a temperature at the mixer outlet of 180° C. Following the same protocols and using the same millings as in tests 5A and 5B, this regenerating agent was used to fabricate a recycled coated material, followed by the preparation of all of the samples for evaluation; the evaluation results are presented in Table 10 below.

TABLE 10

| Rotary Cutting Press | | |
|---|---|---|
| Compactness at 60 rotations | % | 96 |
| Compactness at 80 rotations | % | 96.5 |
| Rutting Test | | |
| Compactness of slabs | % | 96.3 |
| Ruts at 60° C. after 15,000 cycles | % | 4.5 |
| Ruts at 60° C. after 30,000 cycles | % | 5.2 |
| Direct Tensile Test | | |
| Modulus at 10° C./0.01 second | MPa | 11,700 |
| Modulus at 0° C./300 seconds | MPa | 7350 |
| Marshall Compression Test | | |
| Compression strength | kg/cm$^2$ | 1320 |
| Deformation | mm | 2.2 |

These results confirm the excellent performance afforded by this recycled coated material at a level equivalent to those obtained with a normal "ready-to-use" polymer asphalt, as well as with new aggregate. With the old discontinuous process, such an operation would not have been possible under these conditions.

Following the concept of the invention, it is possible to incorporate into another mixture or into the reactive sulfur-containing asphalt mixture other polymers such as plastics or powder from used tires associated with waste lubricant.

EXAMPLE 5E

Referring to the conditions of example 5A, i.e., using regenerating agent (ARRPC), 10 parts low-density polyethylene polymer in 90 parts of the reactive asphalt mixture was added to the reactive asphalt mixture. With this new product and reproducing the conditions of example 5A, following the process of the invention, the following were fabricated:

a crosslinked polymer asphalt based on styrene-butadiene and polypropylene (ARRPCE) as the regeneration agent and, from the latter product, the reconstitution asphalt was reproduced such as was obtained by an operation involving the recycling of the millings from example 5: that is, by mixing 24 parts of additive (ARRPCE) in 76 parts of the old asphalt that is extracted from the millings. The binder that was thus regenerated was referred to as (BR). The results of evaluating the characteristics of this regenerated asphalt are presented in

|  | Asphalt ARRPCE | | Regenerated Asphalt BR | |
|---|---|---|---|---|
|  | Before RTFOT* | After RTFOT* | Before RTFOT* | After RTFOT* |
| Penetration 0.01 mm | 180 | 127 | 30 | 27 |
| TBA ° C. | 76 | 5.9 | 9.8 | 84 |
| Tensile Test 20° C. - 10 mm/minute | | | | |
| Stress at failure kg/cm$^2$ | 4.5 | 5.9 | 9.8 | 13.1 |
| Elongation at rupture, % | >900 | 880 | 470 | 340 |

*Rolling Thin Film Oven Test

As these results show, the favorable results noted confirm the good integration of the polyethylene into the crosslinked mesh, thereby helping to impart greater rigidity to the asphalt medium. This criterion can be understood by comparing the values of recycled asphalt BR and regenerated asphalt BRRPC of example 5A and confirm the possibilities of reusing used polymers by means of the invention.

EXAMPLE 6

As an example of the possibilities of applying the invention to the sealant industry, which requires very highly modified asphalt, according to the conditions required by the invention a crosslinked polymer asphalt was fabricated with 28 percent styrene-butadiene polymer, and it was then evaluated. In order to obtain the comparison indicated here, on the one hand, a polymer asphalt was fabricated by mixing 31.1 parts of polymer (b) in 68.9 parts of asphalt (A): component (J); and, on the other hand, the reactive mixture was fabricated by introducing 1.3 parts sulfur into 98.7 parts asphalt (A): component (K). Using the above-mentioned equipment and following the same protocol as in example 3A, 90 parts polymer asphalt (J) was mixed in 10 parts sulfur reactive asphalt (K). An assessment of the characteristics of the resulting binder produced by continuous fabrication is presented in Table 12 below.

|  | Before RTFOT* | After RTFOT* |
|---|---|---|
| Penetration 0.01 mm | 105 | 87 |
| TBA ° C. | 80 | 85 |
| Tensile Test 20° C. - 10 mm/minute | | |
| Stress at failure kg/cm$^2$ | 7.2 | 8.1 |
| Elongation at rupture, % | >900 | 750 |

*Rolling Thin Film Oven Test

These values indicate a very high level of performance overall, both on the mechanical level and in terms of aging, and confirm the possible uses for conditions of extreme stress.

What is claimed is:

1. Process for the production of an asphalt binder that contains at least one asphalt, one vulcanizing agent, and at least one polymer that is an elastomer or a thermoplastic, wherein said process includes the following steps:

preparing a first concentrated asphalt/polymer material, with a quantity of polymer between 5–35 parts by weight to 95–65 parts by weight asphalt;

preparing a second asphalt/vulcanizing reagent material, with a quantity of vulcanizing reagent that is able to release free sulfur in proportions of 1–150 parts by weight free sulfur to 999–850 parts by weight asphalt;

continuously mixing at least a portion of the first material with at least a portion of the second material so as to produce a final proportion of polymer greater than at least 4% by weight and up to 35% by weight of the total thereby producing a binder; and transferring the binder to a unit for immediate use.

2. The process according to claim 1, further comprising mixing a third material selected from the group consisting of asphalt/virgin polymer and asphalt/elastomer with the first and second materials, such that the final proportion of the polymer is greater than at least 4% by weight and up to 35% by weight of the final product.

3. The process according to claim 1, wherein said process uses at least one polymer which is selected from the group consisting of styrene/butadiene, styrene/butadiene/styrene, styrene/isoprene, and styrene/isoprene/styrene; and the asphalt of the first material is selected from asphalts that have a penetration of 60 to 800 (0.01 mm).

4. The process according to claim 3, wherein the asphalt of the first material has a penetration of 200–500 (0.01 mm).

5. The process according to claim 3, wherein the vulcanizing reagent in the second material is selected from the group consisting of sulfur and sulfur compounds, in quantities of sulfur or sulfur equivalents of the sulfur compounds between 1 and 15% by weight.

6. The process according to claim 5, wherein the asphalt of the second material is selected from asphalts that have a penetration of 10–200 (0.01 mm).

7. The process according to claim 2, wherein the third material is introduced in quantities of between 5–15% by weight.

8. The process according to claim 2, wherein the asphalts are selected from among asphalts with a penetration of between 10–200 (0.01 mm).

9. The process according to claim 8, wherein waste oil is added to the asphalts that are selected in order to produce one or more asphalts with a penetration of between 80–800 (0.01 mm).

10. The process for producing an asphalt binder according to claim 1, wherein the polymer of the first material is an ethylene-propylene-diene copolymer.

11. The process according to claim 2, wherein the recycled polymer of the third material is selected from the group consisting of polyethylene, propylene, vinyl chloride, vinyl acetate, polyurethane, and polyepoxides; and the elastomers obtained from tires.

12. The process for producing a new coated material for roads using the binder produced according to claim 1, which comprises dispersing, at an outlet of the mixture, the binder onto granulates, having a temperature between 160–190° C., at a coating center.

13. The process for producing a recycled coated material using the binder produced according to claim 1, which comprises the following sequential steps:

recovering milling or drilling waste by crushing aggregate, or a coated material that is to be recycled;

determining the quantity and type of asphalt of this coated material to be recycled;

adjusting the binder composition; and dispersing binder on granulates having a temperature between 160–190° C. from the old coated material to be recycled in a coating center.

* * * * *